(12) United States Patent
Stukalin et al.

(10) Patent No.: US 6,243,188 B1
(45) Date of Patent: *Jun. 5, 2001

(54) LIGHT BEAM SCANNING SYSTEM

(75) Inventors: Felix Stukalin, Framingham; Kurt Pelsue, Wayland, both of MA (US)

(73) Assignee: General Scanning, Inc., Watertown, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/192,824

(22) Filed: Nov. 16, 1998

(51) Int. Cl.[7] .................................................. G02B 26/08
(52) U.S. Cl. ............................................ 359/201; 359/202
(58) Field of Search ..................................... 359/201, 202, 359/198, 200, 871, 872

(56) References Cited

U.S. PATENT DOCUMENTS

| 3,998,530 | 12/1976 | Kaschak . |
| 4,364,000 | 12/1982 | Burke, Jr. . |
| 4,655,543 | 4/1987 | Montagu . |
| 4,874,215 | 10/1989 | Montagu . |
| 5,150,249 | * 9/1992 | Montagu .............................. 359/202 |

FOREIGN PATENT DOCUMENTS 54-119259  * 9/1979  (JP) .

* cited by examiner

*Primary Examiner*—James Phan
(74) *Attorney, Agent, or Firm*—Cesari & McKenna, LLP

(57) ABSTRACT

A non-symmetrical scanning mirror for a laser scanning system is stiffer at a bottom end than at a top end. The mirror, which is driven from the bottom end, has a relatively high resonant frequency and can thus accelerate quickly and smoothly. The mirror may be wider or thicker at the bottom end or it may be made stiffer by attaching stiffeners to the bottom end.

14 Claims, 4 Drawing Sheets

LIGHT BEAM SCANNING SYSTEM

FIELD OF INVENTION

The invention relates generally to light beam scanning systems, and more particularly to mirrors for use in such systems.

BACKGROUND OF THE INVENTION

Laser scanning systems, such as those used for marking, laser imaging, laser drilling, semiconductor processing, and other material processing, and other similar application of XY scanning, include two mirrors that position a laser beam relative to a target. The laser beam is first directed over a predetermined horizontal range by an X-mirror. The Y-mirror then intercepts the beam and re-directs it over a predetermined vertical range. The Y-mirror must be long enough to intercept the beam over the entire horizontal range associated with the X-mirror. Accordingly, the Y-mirror is generally larger, and thus, heavier and has greater inertia, than the X-mirror.

The two mirrors must move with equal speed for precise re-direction of the laser beam. Accordingly, the maximum speed with which the mirrors can be driven is determined by the maximum rate at which the larger, heavier mirror smoothly accelerates. The rate of acceleration of a given mirror is essentially limited by the resonant frequency of the mirror, since driving the mirror any harder results in imprecise movement. Generally, the larger Y-mirror has a lower resonant frequency, and thus, a slower rate of acceleration.

To maximize the rate of acceleration, the inertia of the mirror should be as low as possible and the mirror should also be as stiff as possible, so that the mirror responds rapidly and precisely to a drive signal. Accordingly, there is a trade-off between minimizing the weight, and thus, the inertia, of the mirror, and maximizing the stiffness of the mirror.

In prior systems, the weight and inertia of the Y-mirror is minimized by undercutting the corners of the mirror. The cuts are typically symmetric about an axis of symmetry, which is perpendicular to the axis of rotation. The length of the mirror along its axis of rotation is fixed by the rotational range of the X-mirror and the beam aperture, and thus, the undercuts must leave intact an elongated center span of the mirror. The stiffness of the mirror is also essentially provided by the center span. Accordingly, the sizes of the corner cuts are determined as a trade-off between minimizing the weight of the mirror and leaving enough material around the center span to provide sufficient stiffness.

The speed with which the mirrors can be driven determines how quickly the system can, for example, produce a desired mark or image, or the number of holes that can be drilled per second, and so forth. There is thus a need for a laser scanning mirror that can be driven rapidly, without adversely affecting the precision with which it is positioned.

SUMMARY OF THE INVENTION

The invention is a laser scanning system mirror that is non-symmetrical about its axis of symmetry, such that the mirror is stiffest at the bottom end, that is, at the end by which the mirror is driven. The greater stiffness at the bottom of the non-symmetrical mirror, and preferably up to its center of inertia, results in an increase in the resonant frequency of the mirror. Accordingly, the non-symmetrical mirror can accelerate more rapidly than a conventional mirror of the same length, even though the non-symmetrical mirror weighs more than the conventional mirror. Preferably, the non-symmetrical mirror is used as the Y-mirror in a laser scanning system.

The non-symmetrical mirror may have undercut top corners, with the bottom corners left essentially intact. Alternatively, the mirror may have a sloped back face, such that the thickness of the mirror decreases from the bottom of the mirror to the top. As appropriate, stiffeners may be attached to the bottom end of the mirror.

Examples of application in which the present invention is particularly advantageous include electronic manufacturing and repair operation in which a light beam is used to perform profiling, marking, cutting, drilling and trimming of silicon and other semiconducting material, the trimming and cutting of thick and thin films on semiconductors, the drilling of via holes in printed circuit boards, and the inspection of solder paste and component placement on printed circuit boards, among other.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
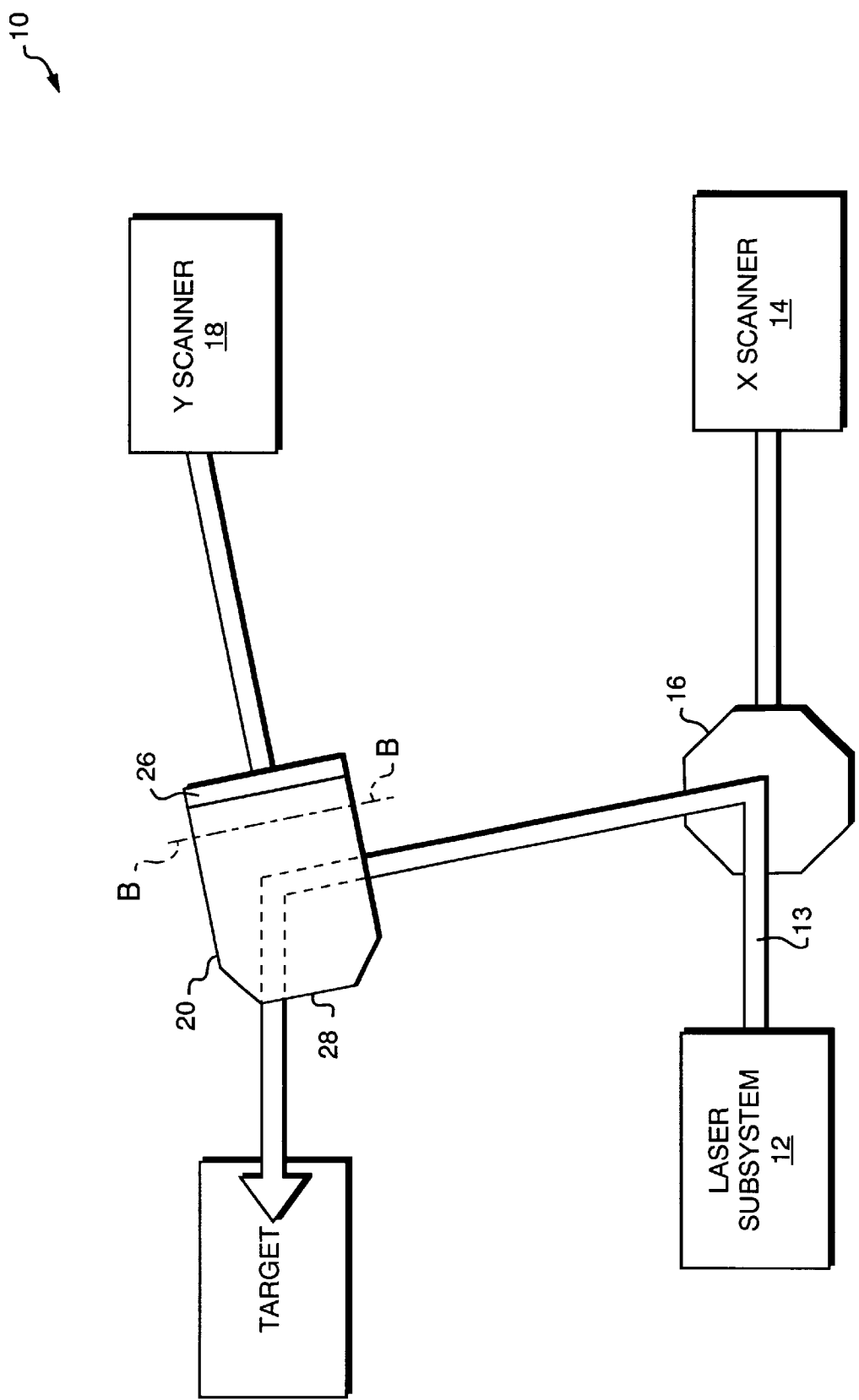
FIG. 1 depicts a laser scanning system that includes a Y-mirror constructed in accordance with the invention.

Referring now to FIG. 1, a laser scanning system 10 includes a laser sub-system 12 that directs a laser beam 13 to an X-mirror 16. The X-mirror 16 rotates under the control of an X-axis scanner 14, to direct the laser beam over a predetermined horizontal range. A Y-mirror 20, which rotates under the control of a Y-axis scanner 18, intercepts the re-directed laser beam. The Y-mirror 20 directs the laser beam over a predetermined vertical range to a desired position on a target 40. The length of the Y-mirror from a bottom end 26 to a top end 28, that is, along its axis of rotation, is fixed by the horizontal range over which the X-mirror directs the laser beam.

The Y-mirror 20 is non-symmetrical about its axis of symmetry, which in the drawing is denoted by the line B—B. The bottom end 26 of the mirror is wider and/or thicker than the top end 28. Accordingly, the end 26 from which the mirror 20 is driven is stiffer than the free end 28, and the mirror 20 has a higher resonant frequency than a conventional, symmetrical mirror of the same length. The Y-mirror 20 can thus accelerate more quickly than the conventional mirror, without sacrificing precision in positioning.

Figure 2:
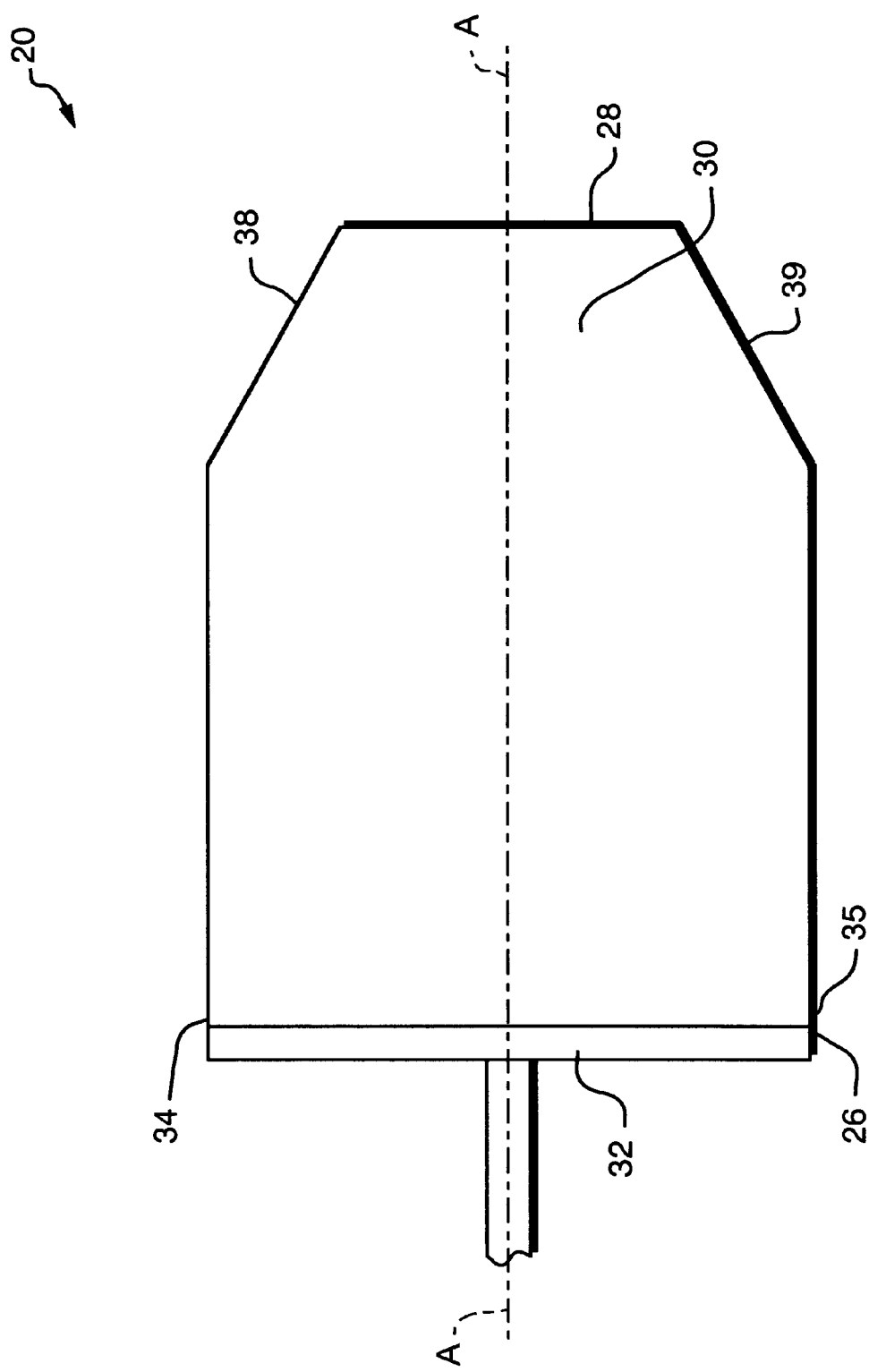
FIG. 2 depicts the Y-mirror of FIG. 1 in more detail.

Referring now also to FIG. 2, the Y-mirror 20 consists of a mirror substrate 30 and a mirror mount 32. The mirror mount 32 attaches to the bottom end 26 of the mirror 20 and also clamps onto an end of an axle 23, which rotates under the control of the Y-axis scanner 18 and drives the mirror 20. The mirror substrate 30 and the mirror mount 32 may be all one piece and made of metal. The back side of the mount 32 may then be extended along the mirror substrate, to increase the stiffness of the bottom end 26 of the mirror. Typically, however, the substrate and the mount are two separate pieces made from different materials, with the mirror mount optimized to clamp onto the axle 23 and the substrate optimized for stiffness and desired optical properties.

As discussed, the substrate 30 has a fixed length along its axis of rotation, which is depicted in the drawing by the line A—A. The top end 28 of the Y-mirror substrate 30 is shaped, that is, the corners 38 and 39 are undercut, to reduce the overall weight of the mirror. The bottom corners 34 and 35 are essentially intact, such that the bottom end 26 is wider, and therefore, stiffer than the top end 28. Preferably, the mirror 20 is relatively stiff from the bottom end 26 up through its center of inertia. One or both of the bottom corners 34 and 35 may instead be slightly undercut, as desired, as long as the bottom end of the mirror remains stiffer than the top end.

The non-symmetrical mirror 20 is not only strategically stiffer than the conventional mirror, it is also heavier, due to the wider and/or thicker bottom end 26. The adverse effects associated with the increased weight of the Y-mirror 20, namely, those associated with increased inertia, are more than offset by the advantages associated with the increase in the resonant frequency of the mirror. With a higher resonant frequency, the mirror 20 can be driven with more power, as necessary, to accelerate the mirror rapidly without sacrificing precision in the positioning of the mirror.

Figure 3:
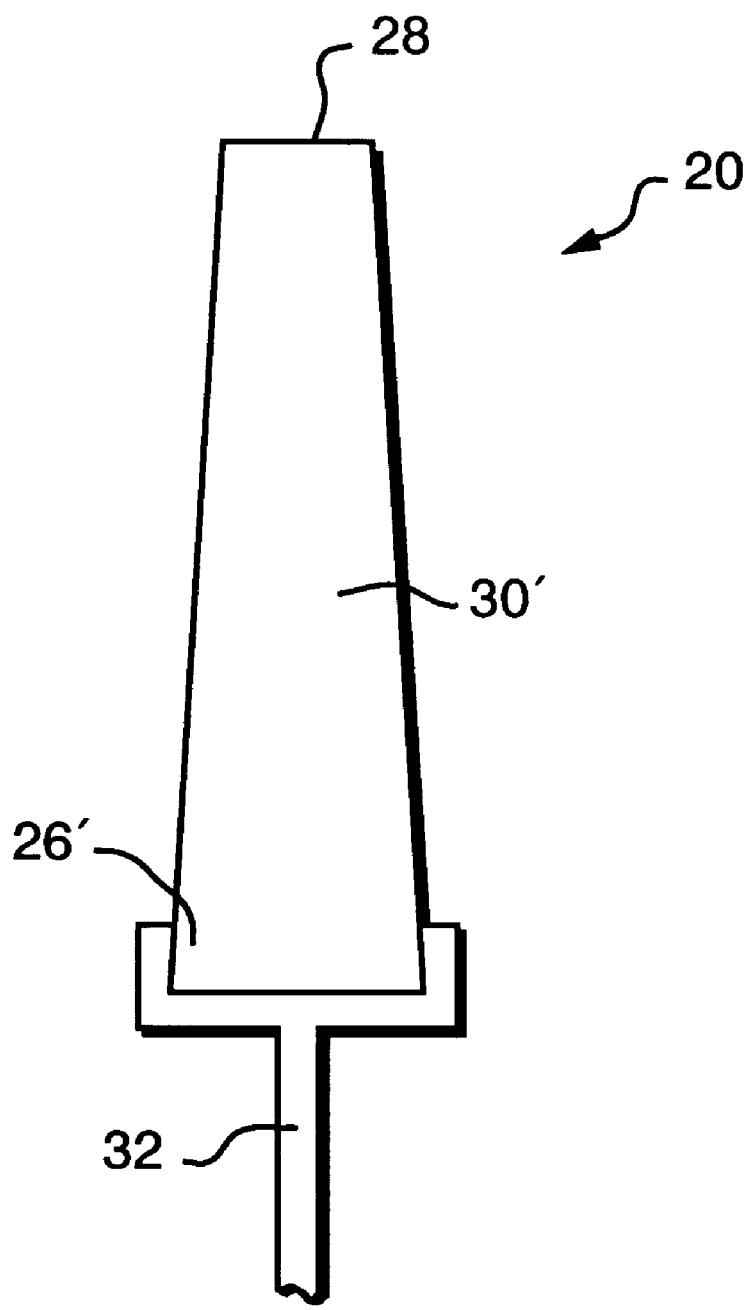
FIG. 3 is an alternative embodiment of the Y-mirror of FIG. 1.

Referring now to FIG. 3, an alternative embodiment of the Y-mirror assembly 20 includes a mirror substrate 30' that has a bottom end 26' which is thicker, and thus, stiffer, than the top end 28. The thickness of the mirror is varied over at least the bottom end 26' and preferably up to the center of inertia of the mirror. The thickness may be varied over the entire length of the mirror, as desired, to minimize the overall weight of the mirror. Further, the top corners 38 and 39 of the mirror may be undercut, as discussed above with reference to FIG. 2.

The mirror substrate 30' may be produced by, for example, appropriately shaving or slicing a substrate of uniform thickness. Alternatively, the mirror 20 may be constructed with varying thickness. To avoid distortions in the reflecting face of the mirror, a front face 34 of the mirror substrate 30' is preferably flat and a back face 36 of the mirror is angled such that the thickness of the mirror varies over its length, as depicted in the drawing.

Figure 4:
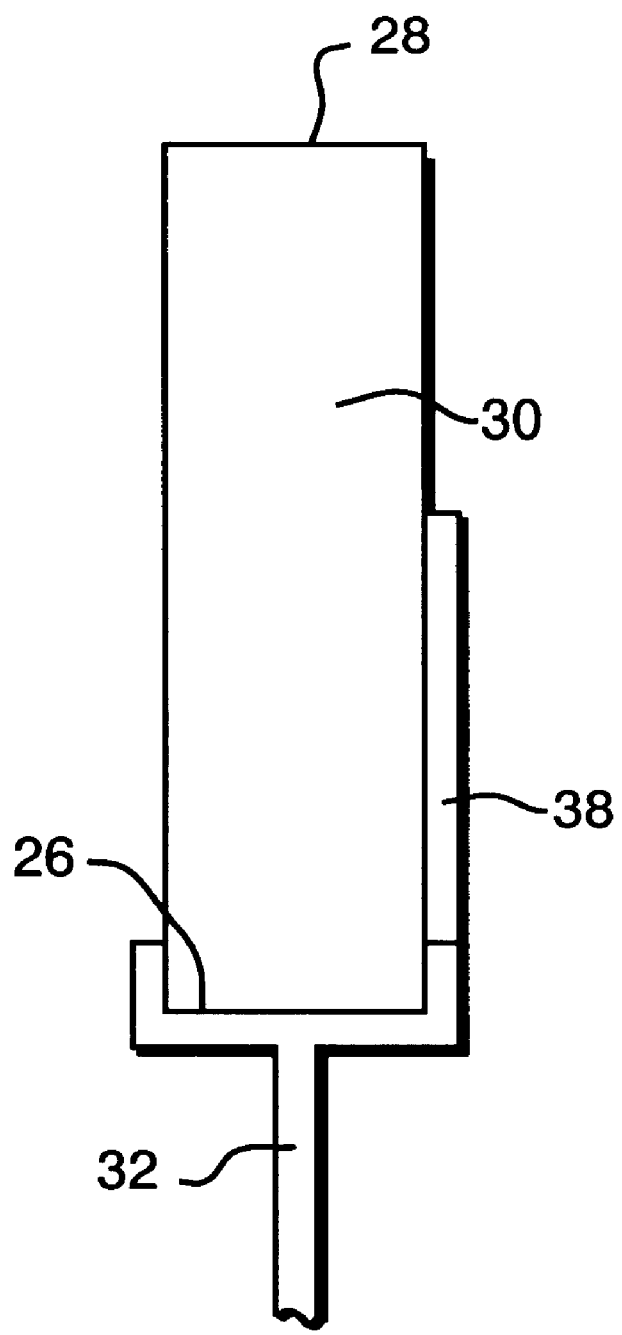
FIG. 4 is an alternative embodiment of the Y-mirror of FIG. 3

Alternatively, as depicted in FIG. 4, the mirror 20 may be made thicker at the bottom end 26 by attaching one or more stiffeners 22 to the back face 36 of the mirror substrate 30. Preferably, the stiffeners 22 are made out of the same material and polished in the same manner as the mirror substrate 30, such that the stiffeners and the substrate both expand and contract in the same manner in response to changes in ambient temperature.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention. For example, the non-symmetrical mirror is preferably used in place of the larger of the two conventional mirrors in the laser scanning system. If the X-mirror is the larger mirror in a given system, the non-symmetrical mirror is used in place of the conventional X-mirror. Further, both conventional mirrors may be replaced by the non-symmetrical mirrors, with the larger of the two mirrors having a more pronounced stiffness at its bottom end relative to its top end than the smaller of the two mirrors.

What is claimed is:

1. A scanning system for directing a light beam to a target, the system including:

A. an X-mirror for directing a light beam along an X axis the X-mirror having top and bottom ends;

B. a Y-mirror for redirecting the light beam along a Y axis, the Y-mirror being stiffer at a bottom end from which rotation is controlled than at an opposite top end; and C. means for controlling the rotations of the X-mirror and the Y-mirror to direct the light beam to a desired position relative to the target, the means driving either one or both mirrors from the bottom end of the mirror.

2. The system of claim 1 wherein the Y-mirror includes a mid-section that extends along an axis of rotation of the mirror between the top and bottom ends.

3. The system of claim 1 wherein:

i. the bottom end of one or both mirrors includes bottom corners; and ii. the top end of one or both mirrors includes top corners that are undercut more than the bottom corners of the bottom end.

4. The system of claim 1 wherein the bottom end of the X-mirror is thicker than the top end.

5. The system of claim 4 wherein the thickness of one or both mirrors varies from the top end to the bottom end.

6. The system of claim 4 wherein i. the bottom end of one or both mirrors includes a front face and a back face, and ii. stiffeners attach to the back face.

7. The system of claim 6 wherein the stiffners are made of the same material and polished to the same finish as the mirror.

8. The system of claim 1 in which either the X-mirror or the Y-mirror forms a portion of a mirror assembly, the mirror assembly including:

A. a mirror with
   i. a top end, and
   ii. a bottom end from which the mirror is driven, the bottom end being stiffer than the top end, and B. a mirror mount with a first end and a second end, the first end attaching to the bottom end of the mirror and the second end attaching to a means for driving the mirror.

9. The system of claim 1 wherein the Y-mirror i. at the bottom end includes bottom corners; and ii. at the top end includes top corners that are undercut more than the bottom corners of the bottom end.

10. The system of claim 10 wherein the bottom end of the Y-mirror is thicker than the top end of the Y-mirror.

11. The system of claim 10 wherein the thickness of the Y-mirror decreases from the bottom end to the top end.

12. The system of claim 10 wherein i. the bottom end of the Y-mirror includes a front face and a back face, and ii. stiffners attach to the back face.

13. The system of claim 12 wherein the stiffeners are made of the same material and polished to the same finish as the mirror.

14. The system of claim 1 wherein the X-mirror is stiffer at a bottom end then a top end.

\* \* \* \* \*